(12) United States Patent
Huang

(10) Patent No.: US 10,743,180 B2
(45) Date of Patent: Aug. 11, 2020

(54) METHOD, APPARATUS, AND SYSTEM FOR AUTHENTICATING WIFI NETWORK

(71) Applicant: Huawei Technologies Co., Ltd., Shenzhen (CN)

(72) Inventor: Zhengquan Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 15/858,181

(22) Filed: Dec. 29, 2017

(65) Prior Publication Data

US 2018/0124608 A1    May 3, 2018

Related U.S. Application Data

(63) Continuation of application No. PCT/CN2016/097948, filed on Sep. 2, 2016.

(30) Foreign Application Priority Data

Sep. 29, 2015 (CN) .......................... 2015 1 0634506

(51) Int. Cl.
*H04W 12/06* (2009.01)
*H04W 84/12* (2009.01)
(Continued)

(52) U.S. Cl.
CPC ............. *H04W 12/06* (2013.01); *H04L 63/08* (2013.01); *H04L 63/18* (2013.01); *H04W 4/80* (2018.02);
(Continued)

(58) Field of Classification Search
CPC ........ H04L 63/08; H04L 63/18; H04W 12/06; H04W 88/06; H04W 4/80; H04W 84/12; H04W 12/08; H04W 8/18
See application file for complete search history.

(56) References Cited

U.S. PATENT DOCUMENTS 9,191,814 B2 * 11/2015 Hazari ................. H04W 12/06
9,537,868 B2 *  1/2017 Manroa ................ H04L 63/10
(Continued)

FOREIGN PATENT DOCUMENTS

CN     1830190 A    9/2006
CN   101621801 A    1/2010
(Continued)

OTHER PUBLICATIONS

Machine Translation and Abstract of Chinese Publication No. CN102625306, Aug. 1, 2012, 33 pages.
(Continued)

*Primary Examiner* — Khang Do
*Assistant Examiner* — Feliciano S Mejia
(74) *Attorney, Agent, or Firm* — Conley Rose, P.C.

(57) ABSTRACT

A method, an apparatus, and a system for authenticating a WI-FI network, where a terminal sends, to an associated authentication center when the WI-FI network exists in an area in which the terminal is located, a request message that carries a user identifier, receives access verification information allocated to a user represented by the first user identifier from the associated authentication center, sends, to a WI-FI authentication center, a login request that carries the access verification information, receives authentication information obtained and fed back by the WI-FI authentication center carrying a user identifier corresponding to the access verification information, and determines that the WI-FI network is a secure network when the user identifier carried in the authentication information is the same as the user identifier carried in the request message.

19 Claims, 10 Drawing Sheets

(51) Int. Cl.
*H04W 4/80* (2018.01)
*H04W 88/06* (2009.01)
*H04L 29/06* (2006.01)
*H04W 8/18* (2009.01)
*H04W 12/08* (2009.01)

(52) U.S. Cl.
CPC ............ *H04W 8/18* (2013.01); *H04W 12/08* (2013.01); *H04W 84/12* (2013.01); *H04W 88/06* (2013.01)

(56) References Cited

U.S. PATENT DOCUMENTS

| | | | |
|---|---|---|---|
| 9,560,617 | B2* | 1/2017 | Liu ................ H04L 67/02 |
| 10,089,626 | B2* | 10/2018 | Sivashanmugam ... H04L 63/083 |
| 10,149,163 | B2* | 12/2018 | Chen .................... H04W 12/06 |
| 2005/0176407 | A1 | 8/2005 | Tuomi et al. |
| 2006/0184795 | A1* | 8/2006 | Doradla ................. H04L 63/08 |
| | | | 713/167 |
| 2007/0113269 | A1 | 5/2007 | Zhang |
| 2009/0247194 | A1* | 10/2009 | Tarrago .................. H04L 51/14 |
| | | | 455/466 |
| 2012/0144189 | A1 | 6/2012 | Zhong |
| 2013/0276080 | A1* | 10/2013 | Nakonetzki ............. H04L 63/18 |
| | | | 726/7 |
| 2014/0149294 | A1* | 5/2014 | Leevendig ......... G06Q 20/3224 |
| | | | 705/71 |
| 2014/0206285 | A1* | 7/2014 | Jance .................... H04W 76/15 |
| | | | 455/41.2 |

FOREIGN PATENT DOCUMENTS

| | | |
|---|---|---|
| CN | 102625306 A | 8/2012 |
| CN | 103826226 A | 5/2014 |
| CN | 104168565 A | 11/2014 |
| CN | 104247477 A | 12/2014 |
| CN | 104394533 A | 3/2015 |
| EP | 2814271 A1 | 12/2014 |
| WO | 2005013582 A2 | 2/2005 |
| WO | 2008047140 A1 | 4/2008 |

OTHER PUBLICATIONS

Machine Translation and Abstract of Chinese Publication No. CN103826226, May 28, 2014, 14 pages.
Foreign Communication From a Counterpart Application, Chinese Application No. 201510634506.2, Chinese Office Action dated Apr. 10, 2019, 7 pages.
Machine Translation and Abstract of Chinese Publication No. CN104168565, Nov. 26, 2014, 25 pages.
Machine Translation and Abstract of Chinese Publication No. CN104394533, Mar. 4, 2015, 11 pages.
Foreign Communication From a Counterpart Application, PCT Application No. PCT/CN2016/097948, English Translation of International Search Report dated Nov. 28, 2016, 2 pages.
7oreign Communication From a Counterpart Application, European Application No. 16850241.7, Extended European Search Report dated Jun. 7, 2018, 7 pages.

* cited by examiner

METHOD, APPARATUS, AND SYSTEM FOR AUTHENTICATING WIFI NETWORK

CROSS-REFERENCE TO RELATED APPLICATIONS

This application is a continuation of International Patent Application No. PCT/CN2016/097948 filed on Sep. 2, 2016, which claims priority to Chinese Patent Application No. 201510634506.2 filed on Sep. 29, 2015. The disclosures of the aforementioned applications are hereby incorporated by reference in their entireties.

TECHNICAL FIELD

The present disclosure relates to the communications field, and in particular, to a method, an apparatus, and a system for authenticating a WI-FI network.

BACKGROUND

The WI-FI communications technology has been promoted and applied massively because of its free communication frequency band. With the wide application of the WI-FI communications technology, security of a WI-FI network becomes increasingly important.

Because any person or institution may establish or set up a WI-FI network and the WI-FI network is open to terminals, some illegal networks such as phishing networks exist. The phishing networks are disguised as some public WI-FI networks that provide wireless access services for the general public, for example, a WI-FI network established by an operator or a WI-FI network established by a government, a school, or other public institutions, and deceive users into accessing the illegal networks in order to steal personal privacy, sensitive information, and the like. For example, a phishing network may use a service set identifier (SSID) and a login authentication screen that are the same as those of a public WI-FI network, and also require a user to enter a login voucher such as a user name or a password on the login authentication screen. However, an open access mode is used when login is implemented inside the phishing network, that is, the phishing network is accessible without any user name or password. Therefore, whatever information is entered by the user, the user can successfully access the phishing network such that the user is deceived into accessing the phishing network. However, in view of the SSID name or the login screen, the user may wrongly believe that the user has accessed an authentic public WI-FI network. When the user performs online shopping or online payment using the accessed phishing network, personal privacy and sensitive information of the user are rather vulnerable to theft by the phishing network and the user is vulnerable to a huge loss.

Reasons for vulnerability of a public WI-FI network to faking are that the WI-FI network is open and free-of-charge, and more importantly, are that the public WI-FI network provides no perfect access authentication mechanism.

Currently, for ease of using the public WI-FI network, some easy-to-operate access authentication manners are usually used to access the public WI-FI network. For example, authentication is performed using a short message service (SMS) message verification code on a mobile phone or by scanning a quick response code. Such access authentication manners are generally unidirectional authentication, that is, only a network, such as a wireless cellular network or a public WI-FI network, authenticates a terminal. Therefore, such access authentication manners cannot prevent unauthorized network providers from using a spoofing network or a phishing network to spoof a user by faking an authentic public WI-FI network. A public WI-FI network with open accessibility is even easier to fake.

In conclusion, because a public WI-FI network provides no perfect access authentication mechanism, information security of a terminal user cannot be ensured in an authentication process when the user accesses the public WI-FI network.

SUMMARY

Embodiments of the present disclosure provide a method, an apparatus, and a system for authenticating a WI-FI network in order to resolve a problem that information security of a terminal user cannot be ensured in an authentication process when the user accesses a WI-FI network. Specific technical solutions provided in the embodiments of the present disclosure are as follows.

According to a first aspect, a method for authenticating a WI-FI network is provided, including sending, by a terminal when determining that a WI-FI network exists in an area in which the terminal is located, a request message to an associated authentication center, where the request message carries a first user identifier, and receiving access verification information sent by the associated authentication center and allocated to a user represented by the first user identifier, sending, by the terminal, a login request to a WI-FI authentication center in the WI-FI network, where the login request carries the access verification information, and receiving authentication information fed back by the WI-FI authentication center and used to respond to the login request, where the authentication information carries a second user identifier, and determining, by the terminal when the second user identifier carried in the authentication information is the same as the first user identifier, that the WI-FI network is a secure network.

With reference to the first aspect, in a first possible implementation of the first aspect, the user identifier includes a mobile station international subscriber directory number (MSISDN) or an identity.

With reference to the first aspect, in a second possible implementation of the first aspect, determining, by a terminal, that a WI-FI network exists in an area in which the terminal is located includes scanning for, by the terminal, a WI-FI network in the area in which the terminal is located, and determining, according to a result of the scanning, that a WI-FI network exists in the area in which the terminal is located.

According to a second aspect, a method for authenticating a WI-FI network is provided, including receiving, by a WI-FI authentication center, a login request sent by a terminal for logging in to a WI-FI network in which the WI-FI authentication center is located, where the login request carries access verification information, sending, by the WI-FI authentication center to an associated authentication center, the access verification information carried in the login request, receiving a user identifier corresponding to the access verification information and fed back by the associated authentication center, and adding, by the WI-FI authentication center, the user identifier to authentication information, and sending, to the terminal, the authentication information carrying the user identifier.

According to a third aspect, a method for authenticating a WI-FI network is provided, including allocating, by an associated authentication center when receiving a request message that carries a user identifier, access verification information to the user identifier, correspondingly storing the user identifier and the access verification information allocated to the user identifier, notifying, by the associated authentication center, the access verification information to a terminal used by a user represented by the user identifier, receiving, by the associated authentication center, access verification information sent by a WI-FI authentication center, querying for the correspondingly stored user identifier according to the access verification information, and feeding back the found user identifier to the WI-FI authentication center.

With reference to the third aspect, in a first possible implementation of the third aspect, notifying, by the associated authentication center, the access verification information to a terminal used by a user represented by the user identifier includes notifying, by the associated authentication center, the access verification information to the terminal using a wireless cellular network in the form of an SMS message, a quick response code, or a barcode.

According to a fourth aspect, a system for authenticating a WI-FI network is provided, including a terminal configured to send a request message to an associated authentication center when a WI-FI network exists in an area in which the terminal is located, where the request message carries a first user identifier, receive access verification information sent by the associated authentication center and allocated to a user represented by the first user identifier, send a login request to a WI-FI authentication center in the WI-FI network, where the login request carries the access verification information, receive authentication information fed back by the WI-FI authentication center and used to respond to the login request, where the authentication information carries a second user identifier, and determine that the WI-FI network is a secure network when the second user identifier carried in the authentication information is the same as the first user identifier, the WI-FI authentication center configured to receive the login request sent by the terminal for logging in to the WI-FI network in which the WI-FI authentication center is located, send, to the associated authentication center, the access verification information carried in the login request, receive a user identifier corresponding to the access verification information and fed back by the associated authentication center, add the user identifier to the authentication information, send, to the terminal, the authentication information carrying the user identifier, and when receiving the request message that carries the user identifier, the associated authentication center configured to allocate the access verification information to the user identifier, correspondingly store the user identifier and the access verification information allocated to the user identifier, notify the access verification information to the terminal used by a user represented by the user identifier, receive the access verification information sent by the WI-FI authentication center, query for the correspondingly stored user identifier according to the access verification information, and feedback the found user identifier to the WI-FI authentication center.

According to a fifth aspect, an apparatus for authenticating a WI-FI network is provided, including a first transceiver unit configured to send a request message to an associated authentication center when a WI-FI network exists in an area in which the apparatus is located, where the request message carries a first user identifier, and receive access verification information sent by the associated authentication center and allocated to a user represented by the first user identifier, a second transceiver unit configured to send a login request to a WI-FI authentication center in the WI-FI network, where the login request carries the access verification information, and receive authentication information fed back by the WI-FI authentication center and used to respond to the login request, where the authentication information carries a second user identifier, and a processing unit configured to determine that the WI-FI network is a secure network when the second user identifier carried in the authentication information is the same as the first user identifier.

With reference to the fifth aspect, in a first possible implementation of the fifth aspect, the user identifier includes an MSISDN or an identity.

With reference to the fifth aspect, in a second possible implementation of the fifth aspect, the apparatus further includes a detection unit configured to scan for a WI-FI network in the area in which the apparatus is located, and determine, according to a result of the scanning, that a WI-FI network exists in the area in which the apparatus is located.

According to a sixth aspect, an apparatus for authenticating a WI-FI network is provided, including a first transceiver unit configured to receive a login request sent by a terminal for logging in to a WI-FI network in which the WI-FI authentication center is located, where the login request carries access verification information, and a second transceiver unit configured to send, to an associated authentication center, the access verification information carried in the login request, and receive a user identifier corresponding to the access verification information and fed back by the associated authentication center, where the first transceiver unit is further configured to add the user identifier to authentication information, and send, to the terminal, the authentication information carrying the user identifier.

According to a seventh aspect, an apparatus for authenticating a WI-FI network is provided, including an allocation unit configured to allocate access verification information to the user identifier when a request message that carries a user identifier is received, a first transceiver unit configured to correspondingly store the user identifier and the access verification information allocated to the user identifier, and notify the access verification information to a terminal used by a user represented by the user identifier, and a second transceiver unit configured to receive access verification information sent by a WI-FI authentication center, and query for the correspondingly stored user identifier according to the access verification information, and feedback the found user identifier to the WI-FI authentication center.

With reference to the seventh aspect, in a first possible implementation of the seventh aspect, the first transceiver unit is further configured to notify the access verification information to the terminal using a wireless cellular network in the form of an SMS message, a quick response code, or a barcode.

In the embodiments of the present disclosure, the terminal sends the request message to the associated authentication center to request to access the WI-FI network, where the request message carries the first user identifier. Authenticity of the WI-FI network is indirectly verified by determining whether the accessed WI-FI network can be interconnected to a trusted associated authentication center. That is, authentication is performed on the accessed WI-FI network using the authentication information that is fed back by the WI-FI authentication center and that carries the second user identifier. In this way, the associated authentication center strictly examines authenticity and security of the WI-FI network when the WI-FI authentication center is interconnected to the associated authentication center. This ensures not only authenticity and security of a network in which the associated authentication center is located, but also authenticity and security of the accessed WI-FI network. Therefore, information security of a terminal user can be ensured.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
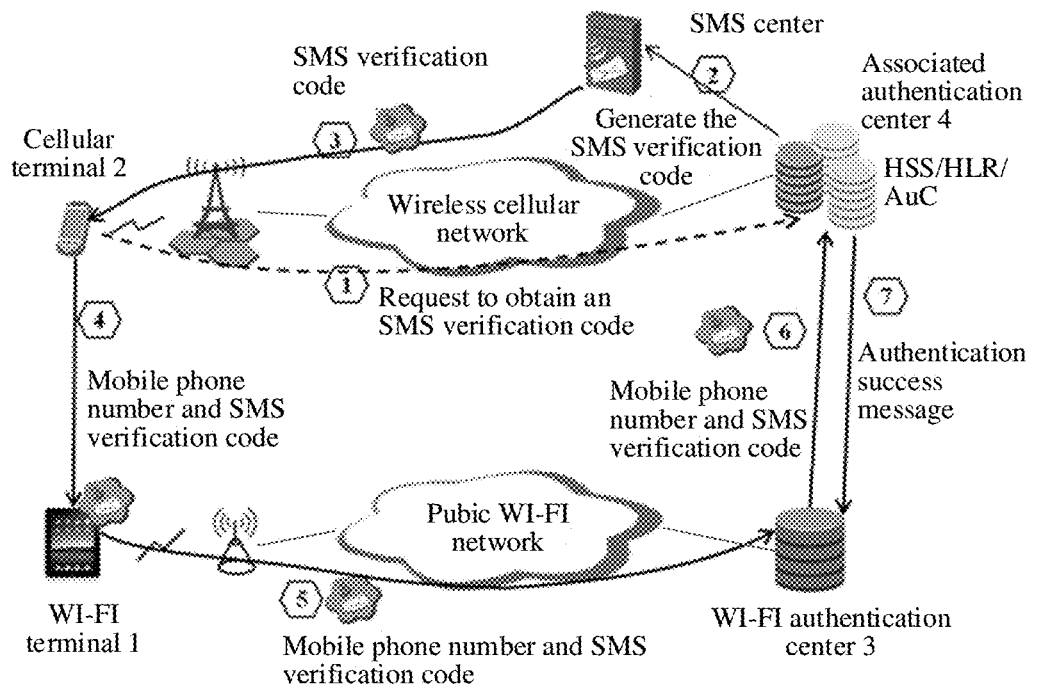
FIG. 1 is a schematic diagram of an authentication process of accessing a public WI-FI network by a WI-FI terminal.

Referring to FIG. 1, FIG. 1 shows an authentication process of accessing a WI-FI network using an SMS message verification code. Generally, a public WI-FI network established by an operator and a wireless cellular network complement each other. The public WI-FI network generally includes a WI-FI terminal 1 and a WI-FI authentication center 3, and the wireless cellular network includes a cellular terminal 2 and an associated authentication center 4. Optionally, the associated authentication center 4 herein may be a home subscriber server (HSS), a home location register (HLR), or an authentication center (AuC) that is disposed on the wireless cellular network side. When a user requires to access the public WI-FI network of the operator, the cellular terminal 2 (a mobile phone herein) is generally required to obtain an SMS message verification code from the associated authentication center 4 in the wireless cellular network. Then the SMS message verification code and a mobile phone number are entered on a public WI-FI network login screen of the WI-FI terminal 1. The WI-FI authentication center 3 in the public WI-FI network transmits the entered SMS message verification code and the entered mobile phone number to the associated authentication center 4, and the associated authentication center 4 verifies the SMS message verification code and the mobile phone number. After the verification succeeds, an authentication success message is fed back to the WI-FI authentication center, and the WI-FI terminal 1 can access the public WI-FI network. If the verification fails, an authentication failure message is fed back to the WI-FI authentication center, and the WI-FI terminal 1 is rejected from accessing the public WI-FI network. FIG. 1 shows the general process.

Figure 2:
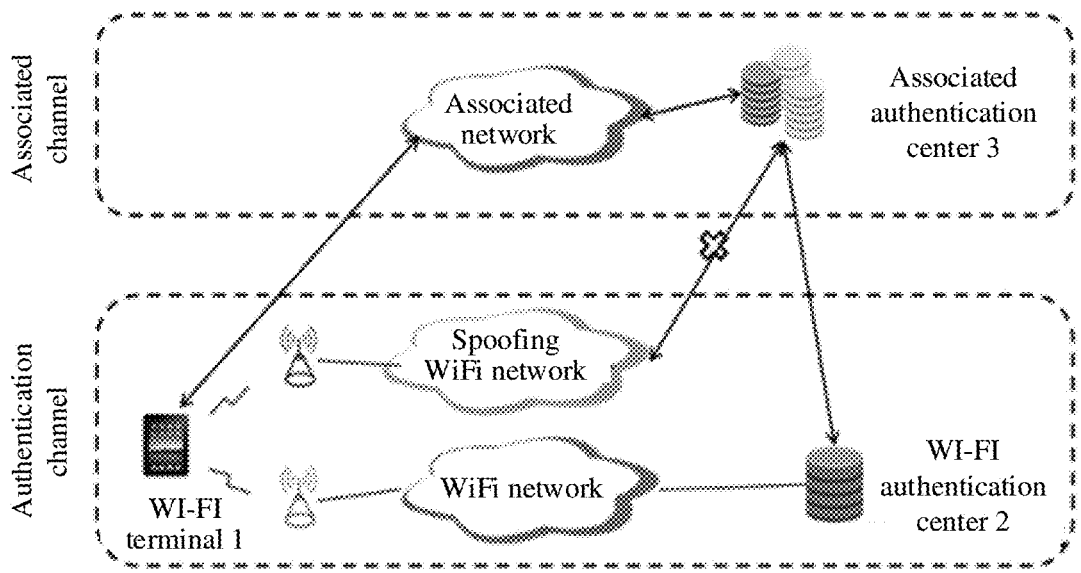
FIG. 2 is a schematic diagram of a dual-channel authentication system architecture according to an embodiment of the present disclosure.

Based on the authentication mechanism and process of accessing a WI-FI network using an SMS message verification code, referring to FIG. 2, an embodiment of the present disclosure provides a dual-channel authentication system, including a WI-FI terminal 1, a WI-FI authentication center 2, and an associated authentication center 3.

The WI-FI terminal 1 is configured to send a request message to the associated authentication center 3 when a WI-FI network exists in an area in which the WI-FI terminal 1 is located, where the request message carries a first user identifier, and receive access verification information sent by the associated authentication center 3 and allocated to a user represented by the first user identifier, send a login request to the WI-FI authentication center 2 in the WI-FI network, where the login request carries the access verification information, receive authentication information fed back by the WI-FI authentication center 2 and used to respond to the login request, where the authentication information carries a second user identifier, and determine that the WI-FI network is a secure network when the second user identifier carried in the authentication information is the same as the first user identifier.

The WI-FI authentication center 2 is configured to receive the login request sent by the WI-FI terminal 1 for logging in to the WI-FI network in which the WI-FI authentication center 2 is located, where the login request carries the access verification information, send, to the associated authentication center 3, the access verification information carried in the login request, and receive a user identifier corresponding to the access verification information and fed back by the associated authentication center 3, and add the user identifier to the authentication information, and send, to the WI-FI terminal 1, the authentication information carrying the user identifier.

The associated authentication center 3 is configured to allocate the access verification information to the user identifier when receiving the request message that carries the user identifier, correspondingly store the user identifier and the access verification information allocated to the user identifier, notify the access verification information to the WI-FI terminal 1 used by a user represented by the user identifier, receive the access verification information sent by the WI-FI authentication center 2, query for the correspondingly stored user identifier according to the access verification information, and feedback the found user identifier to the WI-FI authentication center 2.

Based on the dual-channel authentication system shown in FIG. 2, an embodiment of the present disclosure provides a WI-FI network authentication mechanism. The authentication mechanism is an improvement of the authentication mechanism in which authentication is performed on an accessed WI-FI network using an SMS message verification code. Based on the authentication system shown in FIG. 2, in a process in which a WI-FI terminal accesses a WI-FI network, the WI-FI network can authenticate the WI-FI terminal, but more importantly, before or after the WI-FI terminal accesses the WI-FI network, a WI-FI authentication center in the WI-FI network provides the WI-FI terminal with user identification information of the WI-FI terminal that accesses the WI-FI network, and the WI-FI terminal authenticates the WI-FI network according to the obtained user identification information. This prevents spoofing of the accessed WI-FI network and improves network security.

Further, dual channels in the dual-channel authentication system shown in FIG. 2 are an associated channel and an authentication channel. The associated channel is a channel used by the associated authentication center 3 to transmit the access verification information of the WI-FI network to the WI-FI terminal 1 using an associated network. The authentication channel is a channel used by the WI-FI authentication center 2 to transmit the authentication information to the WI-FI terminal 1 using the WI-FI network, after obtaining the authentication information from the associated authentication center 3. It should be noted that in practical application, the WI-FI authentication center 2 and the associated authentication center 3 may be integrated or separately deployed according to an actual requirement. For ease of description, it is assumed that the WI-FI authentication center 2 and the associated authentication center 3 are separately deployed in this embodiment of the present disclosure.

Figure 3:
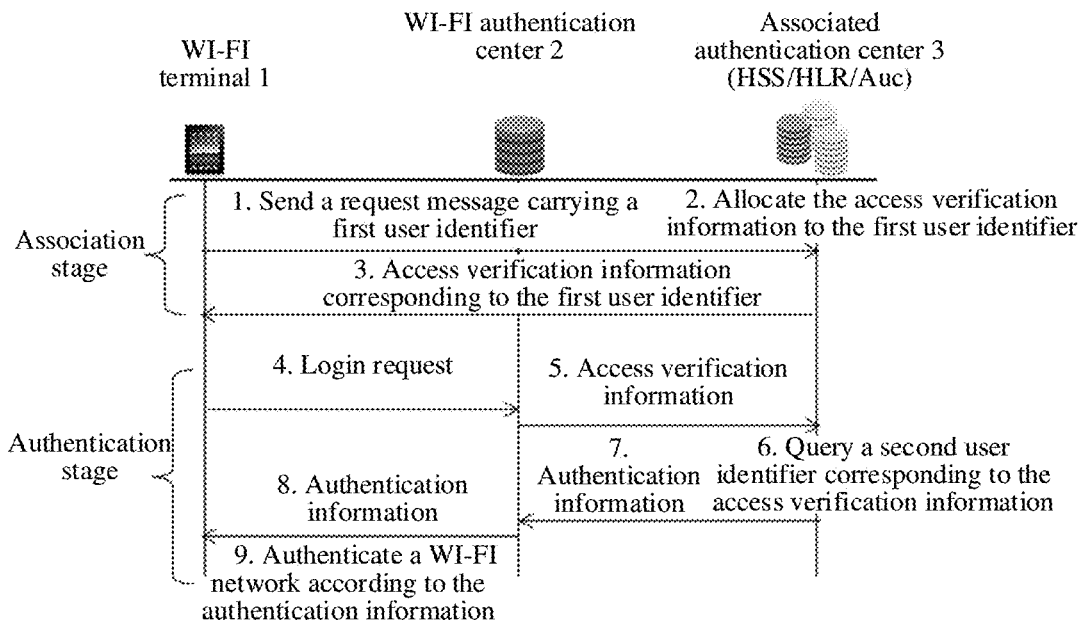
FIG. 3 is a schematic diagram of a process of authenticating a WI-FI network according to an embodiment of the present disclosure.

Based on the dual-channel authentication system shown in FIG. 2, an embodiment of the present disclosure provides a method for authenticating a WI-FI network. FIG. 3 shows an interaction relationship between devices and an authentication process in the dual-channel authentication system. A process of authenticating a WI-FI network includes two stages, an association stage and an authentication stage. The association stage includes step 1 to step 3, and the authentication stage includes step 4 to step 9.

Step 1: When determining, by scanning, that a WI-FI network exists in an area in which a WI-FI terminal 1 is located, the WI-FI terminal 1 sends a request message to an associated authentication center 3, where the request message carries a first user identifier.

The WI-FI terminal 1 in this embodiment of the present disclosure may be any terminal with a WI-FI function such as a tablet (Portable ANDROID Device (PAD)), a smartphone, or a notebook computer, and the user identifier may be one of a mobile phone number, an international mobile subscriber identity (IMSI), an identity card identifier, a social security card identifier, or a passport identifier.

Step 1 may be performed after the WI-FI terminal 1 determines that the WI-FI terminal 1 has accessed the WI-FI network, or may be performed when the WI-FI terminal 1 determines that the WI-FI terminal 1 has not accessed the WI-FI network.

An approach and a manner of requesting, by the WI-FI terminal 1, to obtain access verification information from the associated authentication center 3 are not limited. Using a wireless cellular network, the WI-FI terminal 1 may request to obtain, from the associated authentication center 3, the access verification information allocated to the first user identifier. If the WI-FI terminal 1 has a cellular communication function, using the wireless cellular network, the WI-FI terminal 1 may directly request to obtain the access verification information from the associated authentication center 3. If the WI-FI terminal 1 has no cellular communication function, using the wireless cellular network, another device with the cellular communication function may request to obtain, from the associated authentication center 3, the access verification information allocated to the first user identifier. If the WI-FI terminal 1 has accessed the WI-FI network beforehand, using the WI-FI network, the WI-FI terminal 1 may alternatively request to obtain, from the associated authentication center 3, the access verification information allocated to the first user identifier. Even a dedicated service provided by the associated authentication center 3 may be used to request to obtain, from the associated authentication center 3, the access verification information allocated to the first user identifier. For example, using a dedicated information obtaining system and a wired Internet Protocol (IP) network that are provided by the associated authentication center 3, the WI-FI terminal 1 requests to obtain the access verification information allocated to the first user identifier.

Step 2: When receiving the request message used to obtain access verification information allocated to the first user identifier, the associated authentication center 3 allocates the access verification information to the first user identifier, and correspondingly stores the first user identifier and the access verification information allocated to the first user identifier. Optionally, before allocating access verification information to the first user identifier, the associated authentication center 3 needs to verify the first user identifier, and after the verification succeeds, generates the access verification information corresponding to the first user identifier, and temporarily stores an association relationship between the first user identifier and the corresponding access verification information for a subsequent query.

Step 3: The associated authentication center 3 notifies the access verification information corresponding to the first user identifier to the WI-FI terminal 1.

Optionally, the associated authentication center 3 notifies the access verification information to the WI-FI terminal 1 using the wireless cellular network in the form of an SMS message, or a quick response code, or a barcode, or may notify the access verification information to the WI-FI terminal 1 by other means. For example, the associated authentication center 3 notifies the access verification information to the WI-FI terminal 1 using the wired IP network.

In this case, operations at the association stage are completed using an associated channel. That is, the WI-FI terminal 1 has obtained the access verification information required for accessing the WI-FI network, and information transmission between different devices in the foregoing steps is implemented using an associated network. At the subsequent authentication stage, authentication is performed on the WI-FI network according to the following specific steps (step numbers are continued).

Step 4: The WI-FI terminal 1 adds the access verification information to a login request used for logging in to the WI-FI network, and sends, to a WI-FI authentication center 2, the login request carrying the access verification information.

Step 5: After receiving the login request sent by the WI-FI terminal 1, the WI-FI authentication center 2 sends, to the associated authentication center 3, the access verification information carried in the login request.

Step 6: After receiving the access verification information sent by the WI-FI authentication center 2, the associated authentication center 3 queries for a correspondingly stored second user identifier according to the access verification information.

Step 7: The associated authentication center 3 adds the found second user identifier to authentication information, and feeds back, to the WI-FI authentication center 2, the authentication information carrying the found second user identifier.

Step 8: After receiving the second user identifier corresponding to the access verification information and fed back by the associated authentication center 3, the WI-FI authentication center 2 adds the second user identifier to the authentication information, and sends, to the WI-FI terminal 1, the authentication information carrying the second user identifier.

Step 9: After receiving the authentication information fed back by the WI-FI authentication center 2 and used to respond to the login request, the WI-FI terminal 1 determines whether the second user identifier carried in the authentication information is consistent with the first user identifier used for obtaining the access verification information from the associated authentication center 3. If the second user identifier is consistent with the first user identifier, it indicates that the WI-FI network is a secure network, or if the second user identifier is not consistent with the first user identifier, it indicates that an access risk and a security threat exist in the WI-FI network.

In this case, operations at the authentication stage are completed using an authentication channel. That is, when accessing the WI-FI network, the WI-FI terminal 1 obtains the user identifier corresponding to the access verification information, and attempts to authenticate the WI-FI network by verifying the received user identifier. Information transmission between different devices in steps 4 to 8 is implemented using the authentication channel.

Therefore, in this embodiment of the present disclosure, authenticity of the WI-FI network is indirectly verified by determining whether the accessed WI-FI network can be interconnected to a trusted associated authentication center. That is, the WI-FI network that can be successfully interconnected to the associated authentication center is trusted and secure. The reason is that, in a process of interconnecting to the associated authentication center, the associated authentication center strictly examines authenticity and security of the to-be-interconnected network. This ensures not only authenticity and security of a network in which the associated authentication center is located, but also authenticity and security of the accessed WI-FI network. A spoofing network or a phishing network cannot be interconnected to the associated authentication center and cannot obtain the user identifier from the associated authentication center, and therefore, cannot display, to the user using the WI-FI terminal, the user identifier corresponding to the access verification information that is entered at the time of accessing the WI-FI network. In this way, authenticity of the WI-FI network is verified by verifying whether the WI-FI network can provide a correct user identifier corresponding to the access verification information such that the WI-FI terminal can distinguish between an authentic WI-FI network and a spoofing WI-FI network.

The following uses two specific application scenarios to describe the foregoing method.

Figure 4:
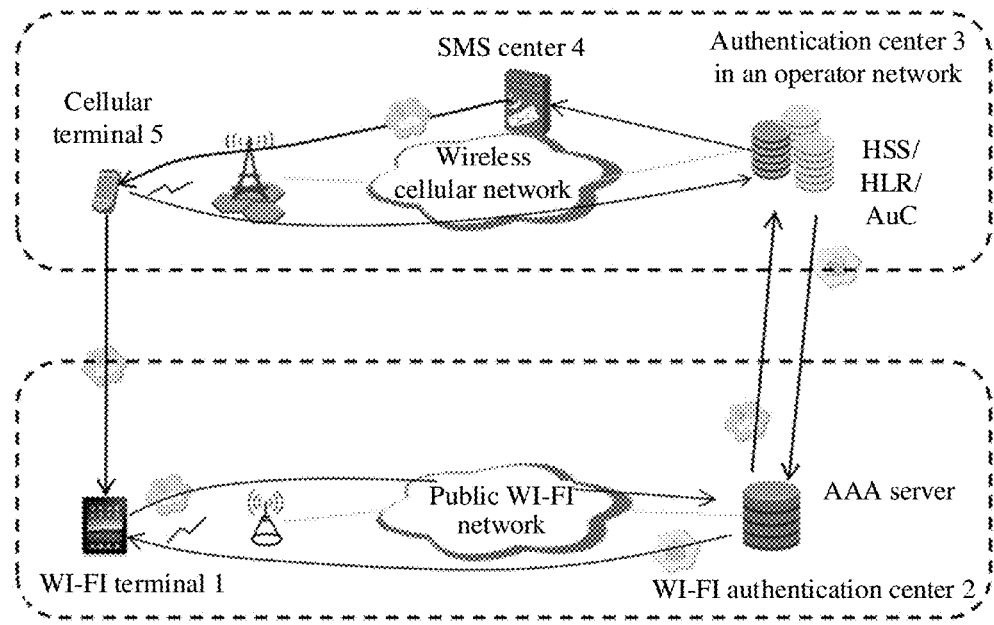
FIG. 4 is a schematic diagram of a dual-channel authentication system architecture in a practical application scenario according to an embodiment of the present disclosure.

Scenario 1:

Referring to FIG. 4, because security and credibility of an operator network are relatively high, an authentication center such as an HSS/HLR/AuC in the operator network is used in scenario 1 to collaboratively implement a function of authenticating a WI-FI network. The operator network includes logical function entities such as a wireless cellular network, an authentication center, and an SMS center. The authentication center and the SMS center in the operator network may be integrated as an associated authentication center to provide functions such as network authentication and message notification.

In the WI-FI network, in addition to a WI-FI terminal, a WI-FI authentication center needs to perform authentication on an accessing user. The WI-FI authentication center may be established independently, or may be established by a third-party organization that specializes in providing an authentication service. For example, the WI-FI authentication center may be an authentication center in the operator network. Regardless of a form of the WI-FI authentication center, the WI-FI authentication center may implement unidirectional access authentication only on the user, and authentication on the WI-FI network needs to be performed in collaboration with an associated authentication center. For ease of description, in scenario 1, it is assumed that an authentication, authorization, and accounting (AAA) server is independently deployed as a WI-FI authentication center in the WI-FI network.

Figure 5:
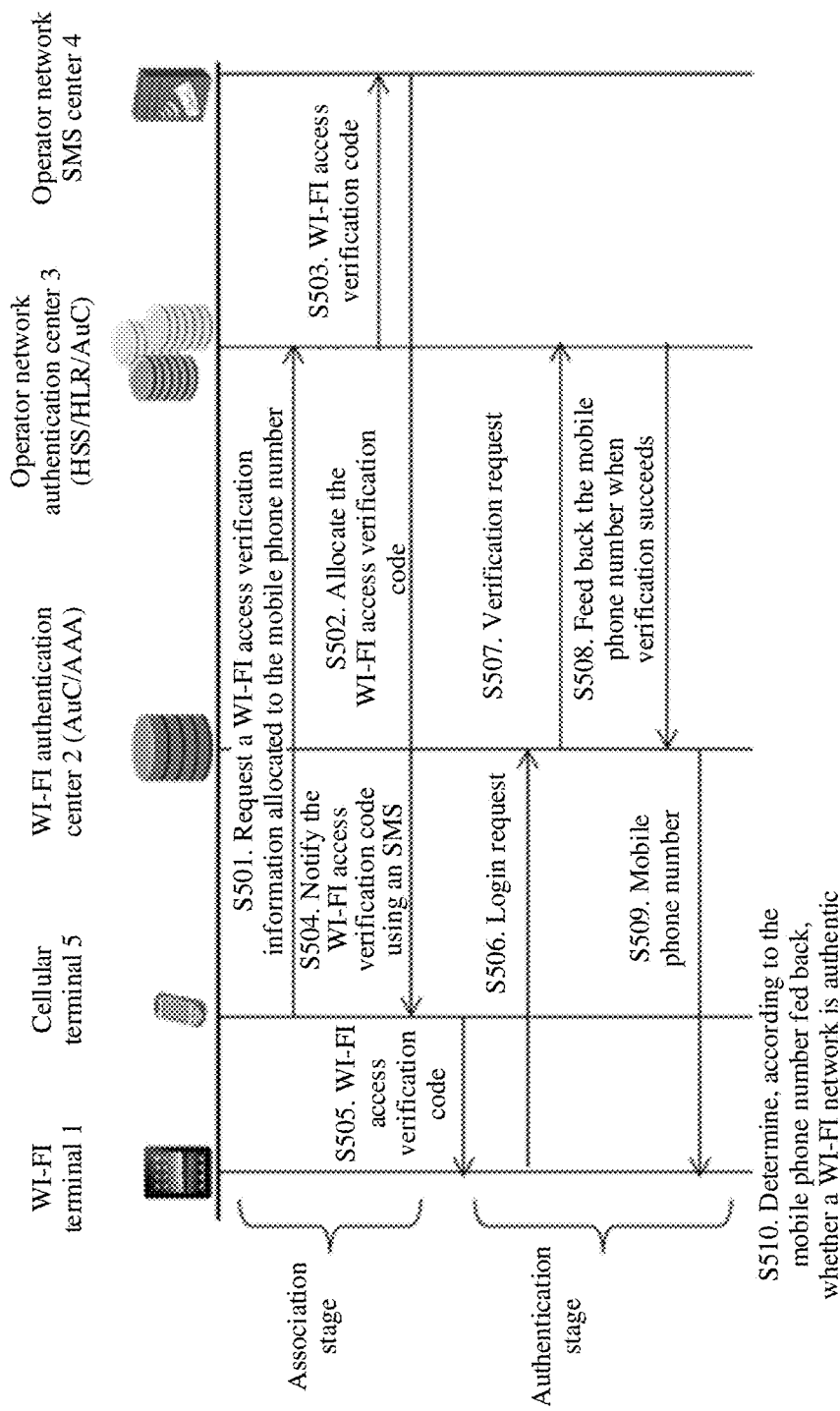
FIG. 5 is a schematic diagram of a dual-channel authentication process in a practical application scenario according to an embodiment of the present disclosure.

For a process of authenticating a public WI-FI network using the system architecture in FIG. 4, refer to FIG. 5. Specific steps are as follows.

Step S501: When a WI-FI terminal 1 needs to access a public WI-FI network, a cellular terminal 5 first uses a first user identifier (herein a mobile phone number of the cellular terminal 5) of a user of the WI-FI terminal 1 to request, from an authentication center 3 in an operator network using a wireless cellular network, WI-FI network access verification information allocated to the mobile phone number.

It should be noted that if the WI-FI terminal 1 has a cellular network communication function, the WI-FI terminal 1 may be integrated with the cellular terminal 5.

Step S502: The authentication center 3 in the operator network verifies the cellular terminal 5, and after the verification succeeds, allocates the corresponding access verification information (that is, a WI-FI access verification code) to the mobile phone number of the cellular terminal 5, and temporarily stores the access verification information for a subsequent query.

Step S503: The authentication center 3 in the operator network sends the mobile phone number of the cellular terminal 5 and the corresponding WI-FI access verification code to the SMS center 4 in the operator network.

Step S504: The SMS center 4 in the operator network sends the received WI-FI access verification code corresponding to the mobile phone number of the cellular terminal 5 to the cellular terminal 5 using the wireless cellular network.

Optionally, the operator SMS center 4 notifies the WI-FI access verification code to the cellular terminal 5 using the wireless cellular network in the form of an SMS message, a quick response code, or a barcode, or may notify the access verification information to the cellular terminal 5 by other means.

Step S505: The user enters the WI-FI access verification code received by the cellular terminal 5 into the WI-FI terminal 1 of the user. This step can be skipped if the WI-FI terminal 1 may be integrated with the cellular terminal 5.

Step S506: The WI-FI terminal 1 adds the WI-FI access verification code to a login request using a public WI-FI network, and transmits, to a WI-FI authentication center 2, the login request carrying the WI-FI access verification code, where the WI-FI authentication center 2 herein is an authentication center or an AAA server (AuC/AAA) that is established by the WI-FI network.

Step S507: The WI-FI authentication center 2 sends, to the authentication center 3 in the operator network for verification, the WI-FI access verification code carried in the login request.

Step S508: The authentication center 3 in the operator network checks, according to the received WI-FI access verification code, whether the corresponding user identifier (that is, the mobile phone number) exists, and if the corresponding mobile phone number exists, feeds back the corresponding mobile phone number to the WI-FI authentication center 2 in the public WI-FI network, or if the corresponding mobile phone number does not exist, feeds back failure information to the WI-FI authentication center 2 in the public WI-FI network.

Step S509: The WI-FI authentication center 2 in the public WI-FI network transmits, to the WI-FI terminal 1, the mobile phone number obtained from the authentication center 3 in the operator network in order to prove that the public WI-FI network knows an association relationship between the user identifier and the access verification information, and further prove authenticity of the public WI-FI network.

Step S510: The user determines whether a mobile phone number displayed on the WI-FI terminal 1 is consistent with the mobile phone number used at the time of requesting the WI-FI access verification code. If the mobile phone number displayed on the WI-FI terminal 1 is consistent with the mobile phone number used at the time of requesting the WI-FI access verification code, it indicates that the public WI-FI network is authentic and trusted and can be accessed securely, or if the mobile phone number displayed on the WI-FI terminal 1 is not consistent with the mobile phone number used at the time of requesting the WI-FI access verification code, it indicates that the public WI-FI network is spoofing and there is an access risk and a security threat.

Scenario 2:

An associated channel in a dual-channel authentication system is implemented using a wired network. The used wired network may be a wired IP network or a dedicated line access point name (APN) network. The wired network is not limited, provided that an association relationship between access verification information of a WI-FI network and a user identifier, such as an identity card identifier or a passport identifier, can be established using the wired network. For example, a credentials management system for identity cards, passports, social security cards, and the like may be used as an associated authentication center, to allocate corresponding access verification information (that is, a WI-FI access verification code) to an entered user identifier (that is, a credentials number) and establish an association relationship between the credentials number and the WI-FI access verification code. Then the associated authentication center is interconnected to a WI-FI authentication center of the to-be-authenticated WI-FI network. The credentials number corresponding to the WI-FI access verification code is obtained from the associated authentication center according to the WI-FI access verification code, and is feedback the credentials number to the WI-FI authentication center. The WI-FI authentication center sends the received credentials number to a corresponding WI-FI terminal to prove its authenticity. Herein, referring to FIG. 6, an identity card management system is used as an associated authentication center for description.

Figure 6:
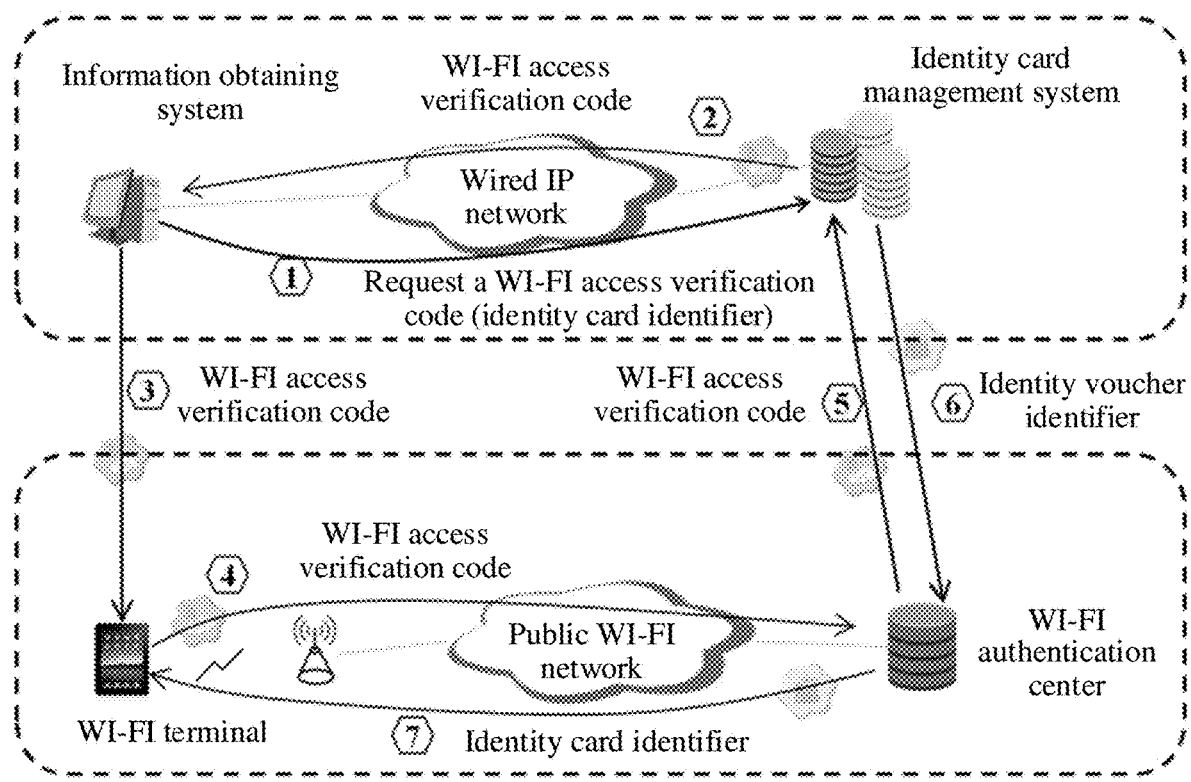
FIG. 6 is a schematic diagram of a dual-channel authentication process in another practical application scenario according to an embodiment of the present disclosure.

As illustrated in FIG. 6, in scenario 2, a process in which the WI-FI terminal obtains the access verification information is different from that in scenario 1. A first user identifier of a user who uses the WI-FI terminal, that is, an identity card identifier herein, is entered into an information obtaining system that is established by the identity card management system. The identity card identifier obtained from the information obtaining system is transmitted to the identity card management system using the wired IP network. The identity card management system allocates corresponding access verification information, that is, a WI-FI access verification code, to the identity card identifier, and temporarily stores the identity card identifier and the corresponding WI-FI access verification code for a subsequent query. Then the identity card management system notifies the access verification code allocated to the identity card identifier. A specific notifying manner is not limited. Optionally, the access verification code is notified to the WI-FI terminal using a cellular network in the form of an SMS message, a quick response code, or a barcode, or the allocated WI-FI access verification code may be displayed in the information obtaining system, and the WI-FI terminal obtains the corresponding WI-FI access verification code from the information obtaining system, or the identity card management system may directly display the access verification code to the WI-FI terminal by means of paper printing. After the WI-FI terminal obtains the WI-FI access verification code, a subsequent process of authenticating the WI-FI network is basically the same as the authentication process in scenario 1, and is not described herein again.

Figure 7:
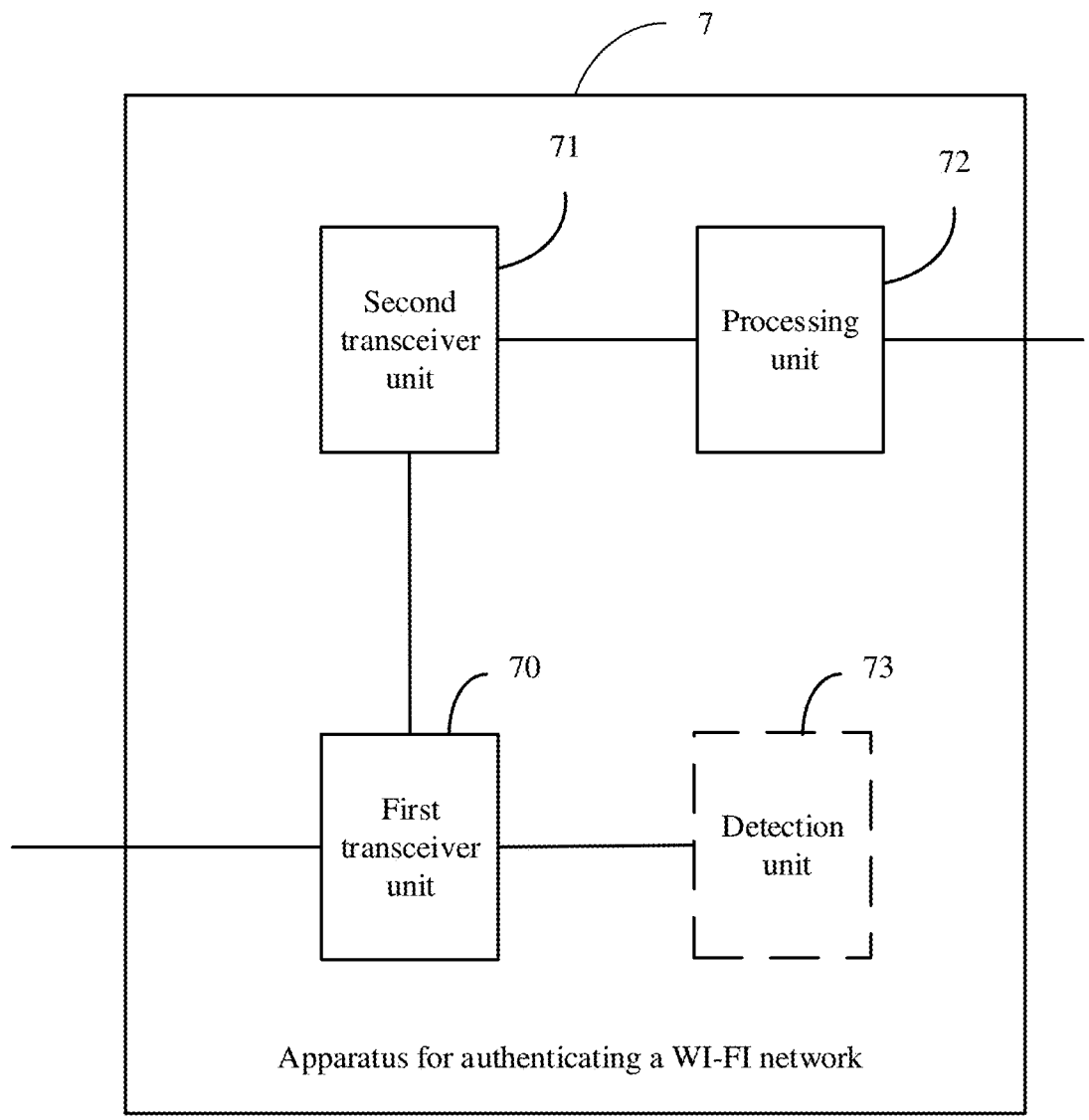
FIG. 7 is a structural diagram of an apparatus for authenticating a WI-FI network according to an embodiment of the present disclosure.

Based on the foregoing embodiment, as shown in FIG. 7, an apparatus for authenticating a WI-FI network 7 provided in an embodiment of the present disclosure includes a first transceiver unit 70 configured to send a request message to an associated authentication center when a WI-FI network exists in an area in which the apparatus is located, where the request message carries a first user identifier, and receive access verification information sent by the associated authentication center and allocated to a user represented by the first user identifier, a second transceiver unit 71 configured to send a login request to a WI-FI authentication center in the WI-FI network, where the login request carries the access verification information, and receive authentication information fed back by the WI-FI authentication center and used to respond to the login request, where the authentication information carries a second user identifier, and a processing unit 72 configured to determine that the WI-FI network is a secure network when the second user identifier carried in the authentication information is the same as the first user identifier.

Optionally, the user identifier includes an MSISDN or an identity.

Optionally, the apparatus 7 further includes a detection unit 73 configured to scan for a WI-FI network in the area in which the apparatus is located, and determine, according to a result of the scanning, that a WI-FI network exists in the area in which the apparatus 7 is located.

Figure 8:
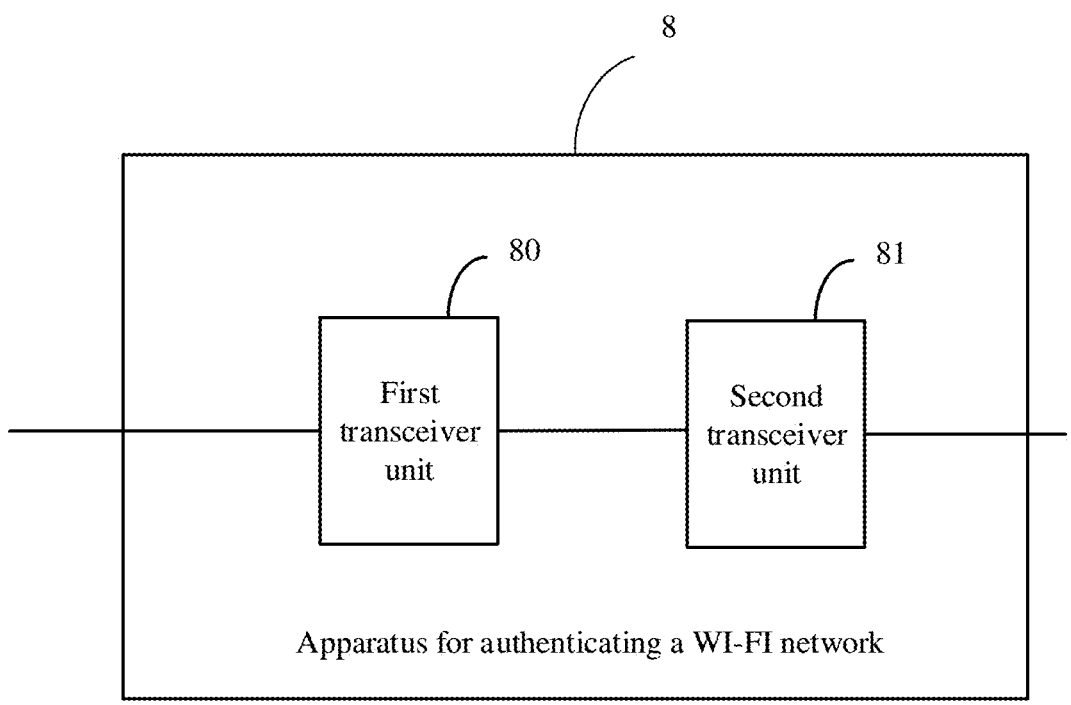
FIG. 8 is a structural diagram of another apparatus for authenticating a WI-FI network according to an embodiment of the present disclosure.

Based on the foregoing embodiment, as shown in FIG. 8, another apparatus for authenticating a WI-FI network 8 provided in an embodiment of the present disclosure includes a first transceiver unit 80 configured to receive a login request sent by a terminal for logging in to a WI-FI network in which the WI-FI authentication center is located, where the login request carries access verification information, and a second transceiver unit 81 configured to send, to an associated authentication center, the access verification information carried in the login request, and receive a user identifier corresponding to the access verification information and fed back by the associated authentication center, where the first transceiver unit 80 is further configured to add the user identifier to authentication information, and send, to the terminal, the authentication information carrying the user identifier.

Figure 9:
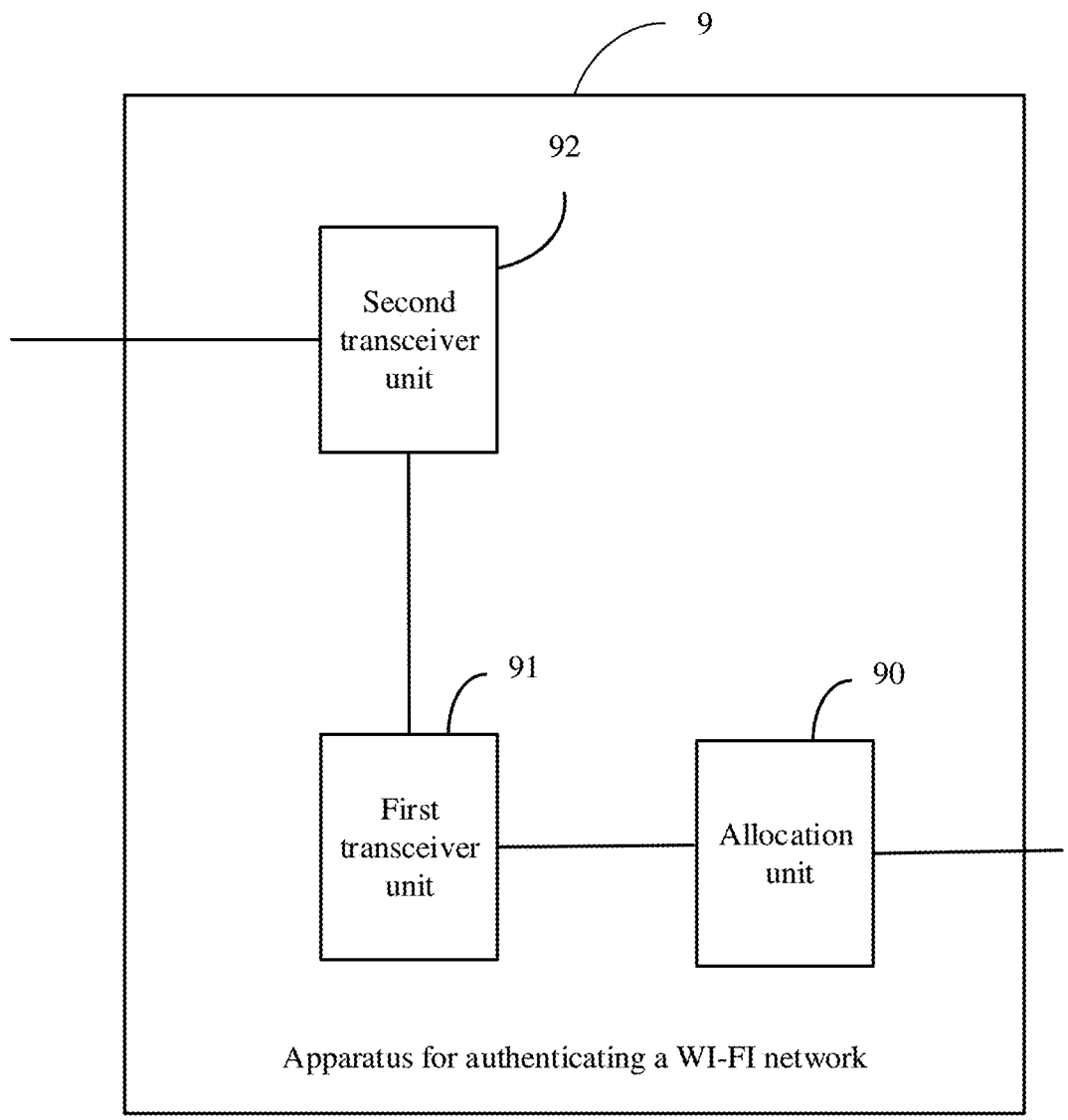
FIG. 9 is a structural diagram of yet another apparatus for authenticating a WI-FI network according to an embodiment of the present disclosure.

Based on the foregoing embodiment, as shown in FIG. 9, yet another apparatus for authenticating a WI-FI network provided in an embodiment of the present disclosure includes an allocation unit 90 configured to allocate access verification information to the user identifier when a request message that carries a user identifier is received, a first transceiver unit 91 configured to correspondingly store the user identifier and the access verification information allocated to the user identifier, and notify the access verification information to a terminal used by a user represented by the user identifier, and a second transceiver unit 92 configured to receive access verification information sent by a WI-FI authentication center, query the correspondingly stored user identifier according to the access verification information, and feedback the found user identifier to the WI-FI authentication center.

Optionally, the first transceiver unit 91 is further configured to notify the access verification information to the terminal using a wireless cellular network in the form of an SMS message, a quick response code, or a barcode.

Figure 10:
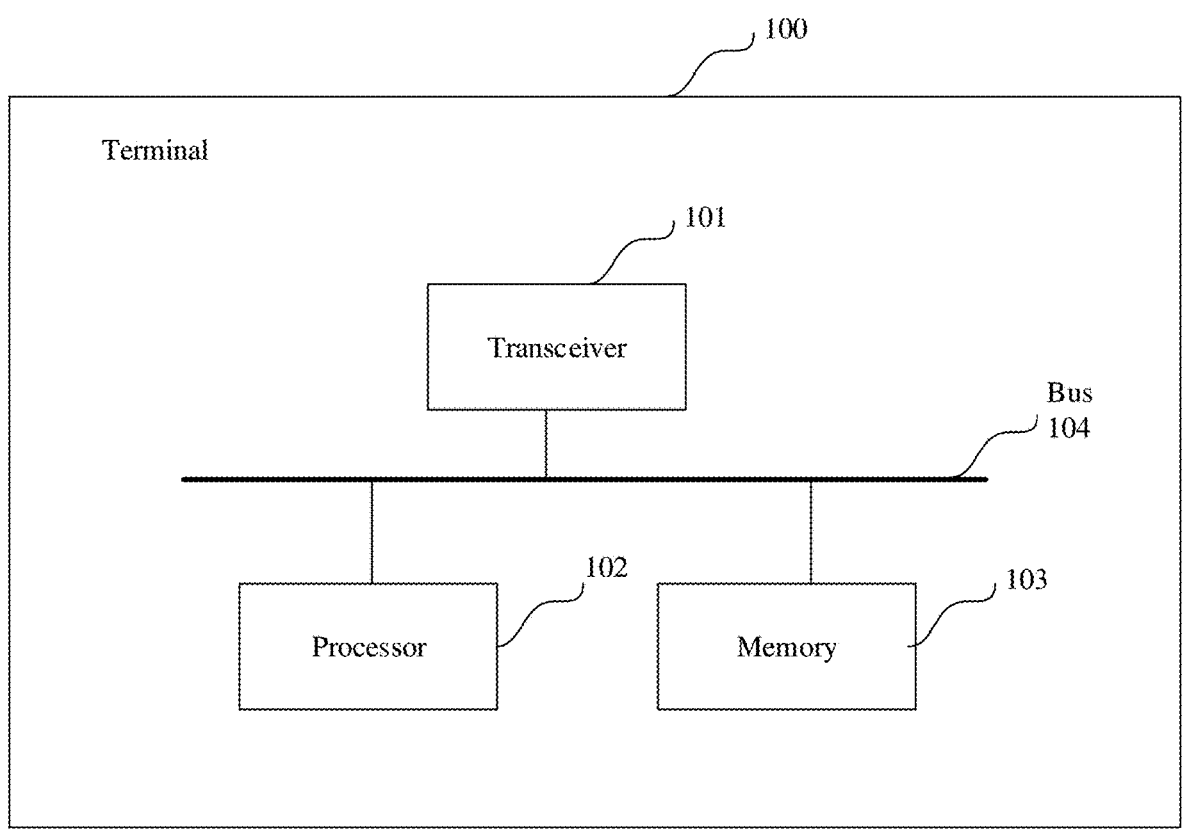
FIG. 10 is a structural diagram of a terminal according to an embodiment of the present disclosure.

Based on the foregoing embodiment, as shown in FIG. 10, an embodiment of the present disclosure provides a terminal 100, and the terminal 100 includes a transceiver 101, a processor 102, a memory 103, and a bus 104, where the transceiver 101, the processor 102, and the memory 103 are coupled to the bus 104.

The transceiver 101 is configured to send a request message to an associated authentication center when a WI-FI network exists in an area in which the terminal is located, where the request message carries a first user identifier, and receive access verification information sent by the associated authentication center and allocated to a user represented by the first user identifier.

The transceiver 101 is further configured to send a login request to a WI-FI authentication center in the WI-FI network, where the login request carries the access verification information, and receive authentication information fed back by the WI-FI authentication center and used to respond to the login request, where the authentication information carries a second user identifier.

The memory 103 is configured to store a group of programs.

The processor 102 is configured to invoke the programs stored in the memory 103 in order to perform the process of determining that the WI-FI network is a secure network when the second user identifier carried in the authentication information is the same as the first user identifier.

Optionally, the user identifier includes an MSISDN or an identity.

Optionally, the processor 102 is further configured to scan for a WI-FI network in the area in which the terminal is located, and determine, according to a result of the scanning, that a WI-FI network exists in the area in which the terminal is located.

Figure 11:
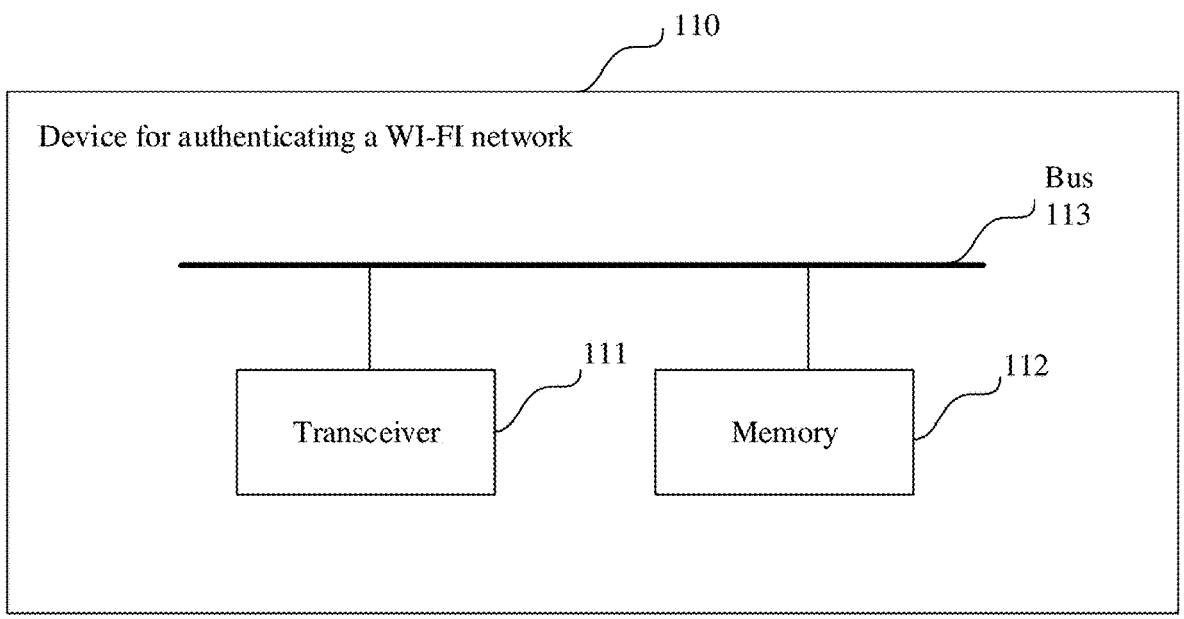
FIG. 11 is a structural diagram of a device for authenticating a WI-FI network according to an embodiment of the present disclosure.

Based on the foregoing embodiment, as shown in FIG. 11, an embodiment of the present disclosure provides a device for authenticating a WI-FI network 110 configured to implement functions of the WI-FI authentication center in the embodiments shown in FIG. 2 to FIG. 6. The authentication device 110 includes a transceiver 111, a memory 112, and a bus 113. The transceiver 111 and the memory 112 are connected to the bus 113.

The memory 112 is configured to store a login request sent by a terminal for logging in to a WI-FI network in which the WI-FI authentication center is located, where the login request carries access verification information.

The transceiver 111 is configured to send, to an associated authentication center, the access verification information carried in the login request stored in the memory 112, and receive a user identifier corresponding to the access verification information and fed back by the associated authentication center.

The transceiver 111 is further configured to add the user identifier to authentication information, and send, to the terminal, the authentication information carrying the user identifier.

Figure 12:
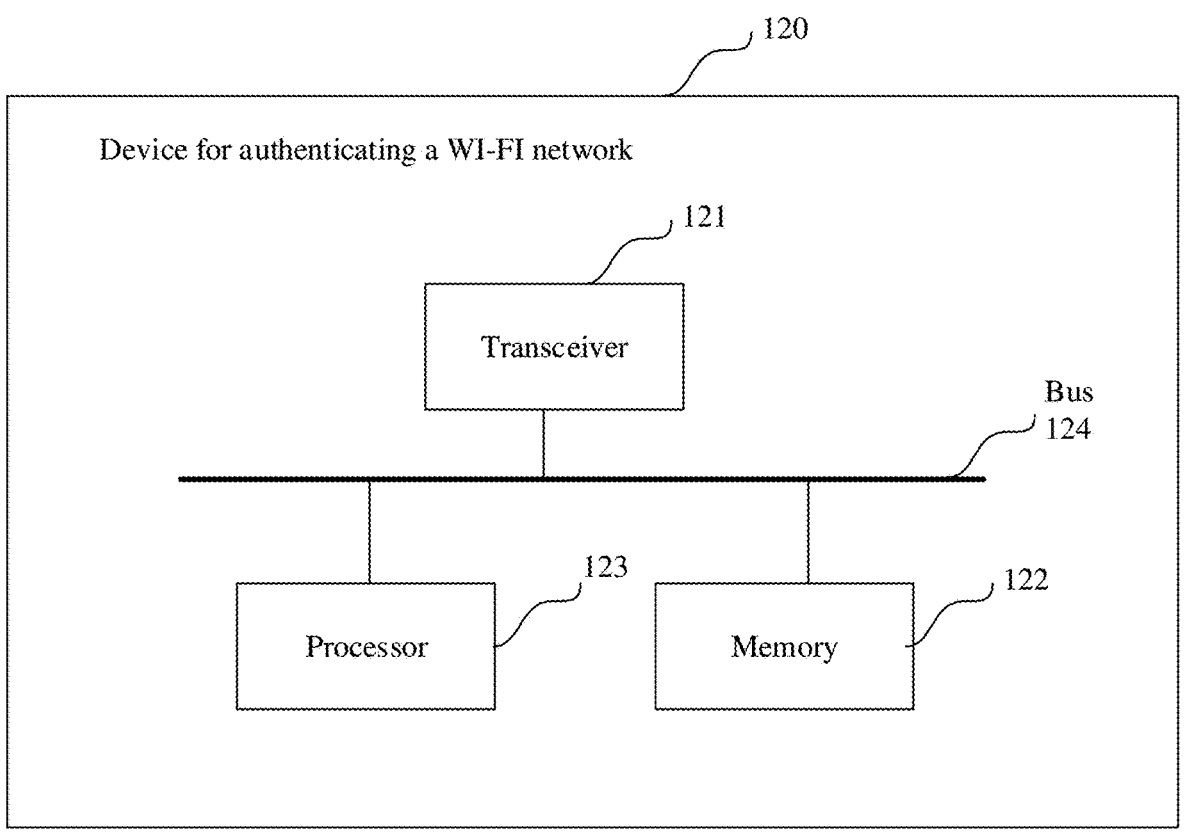
FIG. 12 is a structural diagram of another device for authenticating a WI-FI network according to an embodiment of the present disclosure.

Based on the foregoing embodiment, as shown in FIG. 12, an embodiment of the present disclosure provides another device 120 for authenticating a WI-FI network configured to implement functions of the associated authentication center in the embodiments shown in FIG. 2 to FIG. 6. The device 120 includes a transceiver 121, a memory 122, a processor 123, and a bus 124. The transceiver 121, the memory 122, and the processor 123 are connected to the bus 124.

The memory 122 stores a group of programs.

The processor 123 is configured to invoke the programs stored in the memory 122 in order to perform the process of allocating access verification information to the user identifier when the transceiver 121 receives a request message that carries a user identifier.

The memory 122 is further configured to correspondingly store the user identifier and the access verification information allocated to the user identifier.

The transceiver 121 is further configured to notify the access verification information stored in the memory 122 to a terminal used by a user represented by the user identifier, receive access verification information sent by a WI-FI authentication center, query the correspondingly stored user identifier according to the access verification information, and feedback the found user identifier to the WI-FI authentication center.

Optionally, the transceiver 121 is further configured to notify the access verification information to the terminal using a wireless cellular network in the form of an SMS message, a quick response code, or a barcode.

In conclusion, in the embodiments of the present disclosure, when a WI-FI network exists in the area in which the terminal is located, the terminal sends the request message to the associated authentication center, where the request message carries the first user identifier, and receives the access verification information sent by the associated authentication center and allocated to the user represented by the first user identifier. The terminal sends the login request to the WI-FI authentication center in the WI-FI network, where the login request carries the access verification information, and receives the authentication information fed back by the WI-FI authentication center and used to respond to the login request, where the authentication information carries the second user identifier. When the second user identifier carried in the authentication information is the same as the first user identifier, the terminal determines that the WI-FI network is a secure network. In this way, authenticity of the WI-FI network is indirectly verified by determining whether the accessed WI-FI network can be interconnected to a trusted associated authentication center, that is, authentication is performed on the accessed WI-FI network using the authentication information that is fed back by the WI-FI authentication center and that carries the second user identifier. The associated authentication center strictly examines authenticity and security of the WI-FI network when the WI-FI authentication center is interconnected to the associated authentication center. This ensures not only authenticity and security of a network in which the associated authentication center is located, but also authenticity and security of the accessed WI-FI network. Therefore, information security of a terminal user can be ensured.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact-disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Persons skilled in the art can make various modifications and variations to the embodiments of the present disclosure without departing from the scope of the embodiments of the present disclosure. The present disclosure is intended to cover these modifications and variations provided that they fall within the scope of protection defined by the following claims and their equivalent technologies.

What is claimed is:

1. A method for authenticating a WI-FI network, comprising:
sending, by a terminal, a request message to an associated authentication center using a wireless cellular network when the WI-FI network exists in an area in which the terminal is located, wherein the request message carries a user identifier;
receiving, by the terminal, access verification information allocated to a user represented by the user identifier from the associated authentication center using the wireless cellular network;
sending, by the terminal, a login request to a WI-FI authentication center in the WI-FI network using the WI-FI network, wherein the login request carries the access verification information;
receiving, by the terminal, authentication information from the WI-FI authentication center responding to the login request using the WI-FI network, wherein the authentication information carries a user identifier obtained by the WI-FI authentication center corresponding to the access verification information; and
determining, by the terminal when the user identifier carried in the authentication information received using the WI-FI network is the same as the user identifier carried in the request message sent using the wireless cellular network, that the WI-FI network is a secure network.

2. The method of claim 1, wherein the user identifier comprises a mobile station international subscriber directory number (MSISDN), an international mobile subscriber identity (IMSI) number, an identity card identifier, a social security card identifier, or a passport identifier.

3. The method of claim 1, wherein the WI-FI network is determined to exist in the area in which the terminal is located comprises:
scanning for, by the terminal, the WI-FI network in the area in which the terminal is located; and
determining, by the terminal according to a result of the scanning, that the WI-FI network exists in the area in which the terminal is located.

4. The method of claim 1, wherein the access verification information is received from the associated authentication center using the wireless cellular network in a form of a short message service (SMS) message.

5. The method of claim 1, wherein the access verification information is received from the associated authentication center using the wireless cellular network in a form of a quick response code.

6. The method of claim 1, wherein the access verification information is received from the associated authentication center using the wireless cellular network in a form of a barcode.

7. A system for authenticating a WI-FI network, comprising:
a terminal;
an associated authentication center coupled to the terminal using a wireless cellular network; and
a WI-FI authentication center coupled to the terminal using the WI-FI network and coupled to the associated authentication center,
wherein the terminal is configured to:
send a request message to the associated authentication center using the wireless cellular network when the WI-FI network exists in an area in which the terminal is located, wherein the request message carries a user identifier;

receive access verification information allocated to a user represented by the user identifier from the associated authentication center using the wireless cellular network;

send a login request to the WI-FI authentication center in the WI-FI network using the WI-FI network, wherein the login request carries the access verification information;

receive authentication information from the WI-FI authentication center responding to the login request using the WI-FI network, wherein the authentication information carries a user identifier obtained by the WI-FI authentication center corresponding to the access verification information; and determine that the WI-FI network is a secure network when the user identifier carried in the authentication information received using the WI-FI network is the same as the user identifier carried in the request message sent using the wireless cellular network, wherein the WI-FI authentication center is configured to:
receive the login request from the terminal for logging into the WI-FI network in which the WI-FI authentication center is located;
send, to the associated authentication center, the access verification information carried in the login request;
receive the user identifier corresponding to the access verification information from the associated authentication center;
add the user identifier to the authentication information; and
send, to the terminal, the authentication information carrying the user identifier, and wherein the associated authentication center is configured to:
allocate the access verification information to the user identifier when receiving the request message that carries the user identifier;
store the user identifier and the access verification information allocated to the user identifier;
notify the access verification information to the terminal used by the user represented by the user identifier;
receive the access verification information from the WI-FI authentication center;
query for the stored user identifier according to the access verification information; and
feedback the found user identifier to the WI-FI authentication center.

8. The system of claim 7, wherein the terminal is further configured to:
scan for the WI-FI network in the area in which the terminal is located; and
determine, according to a result of the scanning, that the WI-FI network exists in the area in which the terminal is located.

9. The system of claim 7, wherein the access verification information is received from the WI-FI authentication center using the wireless cellular network in a form of a short message service (SMS) message, a quick response code, or a barcode.

10. The system of claim 7, wherein the user identifier comprises a mobile station international subscriber directory number (MSISDN).

11. The system of claim 7, wherein the user identifier comprises an international mobile subscriber identity (IMSI) number.

12. The system of claim 7, wherein the user identifier comprises an identity card identifier.

13. The system of claim 7, wherein the user identifier comprises a social security card identifier.

14. The system of claim 7, wherein the user identifier comprises a passport identifier.

15. A terminal, comprising:
a transceiver configured to:
send a request message to an associated authentication center using a wireless cellular network when a WI-FI network exists in an area in which the terminal is located, wherein the request message carries a user identifier;
receive access verification information allocated to a user represented by the user identifier from the associated authentication center using the wireless cellular network;
send a login request to a WI-FI authentication center in the WI-FI network using the WI-Fi network, wherein the login request carries the access verification information; and
receive authentication information from the WI-FI authentication center responding to the login request using the WI-FI network, wherein the authentication information carries a user identifier obtained by the WI-FI authentication center corresponding to the access verification information;
a memory comprising instructions; and
one or more processors coupled to the transceiver and the memory, wherein the instructions cause the one or more processors to be configured to determine that the WI-FI network is a secure network when the user identifier carried in the authentication information received using the WI-FI network is the same as the user identifier carried in the request message sent using the wireless cellular network.

16. The terminal of claim 15, wherein the instructions further cause the one or more processors to be configured to:
scan for the WI-FI network in the area in which the terminal is located; and
determine, according to a result of the scanning, that the WI-FI network exists in the area in which the terminal is located.

17. The terminal of claim 15, wherein the access verification information is received from the associated authentication center using the wireless cellular network in a form of a short message service (SMS) message.

18. The terminal of claim 15, wherein the access verification information is received from the associated authentication center using the wireless cellular network in a form of a quick response code.

19. The terminal of claim 15, wherein the access verification information is received from the associated authentication center using the wireless cellular network in a form of a barcode.

* * * * *

UNITED STATES PATENT AND TRADEMARK OFFICE
CERTIFICATE OF CORRECTION

PATENT NO. : 10,743,180 B2  
APPLICATION NO. : 15/858181  
DATED : August 11, 2020  
INVENTOR(S) : Zhengquan Huang Page 1 of 1

It is certified that error appears in the above-identified patent and that said Letters Patent is hereby corrected as shown below:

On the Title Page

Page 2, Column 2, Other Publications, Line 13: "7oreign Communications" should read "Foreign Communications"

Signed and Sealed this  
Thirtieth Day of March, 2021

Drew Hirshfeld  
*Performing the Functions and Duties of the  
Under Secretary of Commerce for Intellectual Property and  
Director of the United States Patent and Trademark Office*